Jan. 5, 1965
J. M. DONDOUX
3,164,776
ARRANGEMENT FOR DISCRIMINATING BETWEEN THE TWO
STATES OF A BINARY SIGNAL
Filed May 9, 1960
6 Sheets-Sheet 1

INVENTOR.
Jacques M. Dondoux
BY
C. A. Gulbrandsen
Atty.

Jan. 5, 1965 J. M. DONDOUX 3,164,776

ARRANGEMENT FOR DISCRIMINATING BETWEEN THE TWO STATES OF A BINARY SIGNAL

Filed May 9, 1960

6 Sheets-Sheet 2

INVENTOR.

Jacques M. Dondoux

BY C. A. Gulbrandsen

Atty.

INVENTOR.
Jacques M. Dondoux
BY C. A. Gullbransen
Atty.

INVENTOR.
Jacques M. Dondoux
BY
C. A. Gulbrandsen
Atty.

INVENTOR.
Jacques M. Dondoux
BY C. A. Gulbrandsen
Atty.

INVENTOR.
Jacques M. Dondoux
BY C. A. Gulbrandsen
Atty.

3,164,776

ARRANGEMENT FOR DISCRIMINATING BETWEEN THE TWO STATES OF A BINARY SIGNAL

Jacques Marcel Dondoux, Paris, France, assignor to Automatic Electric Laboratories, Inc., Northlake, Ill., a corporation of Delaware Filed May 9, 1960, Ser. No. 27,664
Claims priority, application France, May 26, 1959, 795,687, Patent 1,235,437
11 Claims. (Cl. 328—116)

The present invention relates to an amplifier of the differential type particularly designed for the discrimination of the impulse signals received, either on the collecting anode, or on the target of an electrostatic memory tube of the type called "barrier grid."

The binary information contained in such a tube, collected on the collecting anode or on the target, appears under the aspect of two categories of impulse signals, one characterizing the "zeros," the other characterizing the "ones."

In general, the signal "one" differs from the signal "zero" by an initial transitory voltage point; it is therefore possible, during reading, to effect the discrimination between these two signals by taking advantage of this difference in amplitude.

The amplifier of the invention effects, in fact, the discrimination between a signal "one" and a signal "zero" by means of the amplitude of the said signals.

Its important distinction is that it permits the non-rhythmic operation of a barrier grid electrostatic memory tube without the necessity, in due course, of controlling with a high degree of precision, the voltage between the cathode and the "Wehnelt" of the memory tube when the electron beam is unblocked.

It is evident that, from the fact of the transitory nature of the initial voltage peak characterizing the signal "one," the latter is of very short duration; otherwise stated, the amplitude of the signal "one" passes very rapidly from a high value to a level near that of the signal "zero." The amplifier of the invention therefore distinguishes these signals by comparing the maximum amplitude taken by a signal when it starts, and the amplitude which it has after a certain time. This difference is nil in the case of a "zero," and appreciable in the case of a "one."

To this end, the reading signal is applied to the input of a delay line whose delay time $\theta$ is a little less than the duration of the said signal. As a result of this, when the voltage point corresponding to the start of the signal of an amplitude $A(t)$ appears at the output of the delay line, the voltage at the input of this same delay line has an amplitude equal to $A(t+\theta)$, that is, practically that of a "zero."

The two voltages $A(t)$ and $A(t+\theta)$ are applied respectively to the grids of two tubes connected as a differential amplifier. At the output of the latter, there is evidently collected a voltage proportional to the difference $A(t)-A(t+\theta)$ which, after an appropriate amplification, is applied to the input of a diode gate. This latter permits the passage of the signal thus obtained only during a short instant corresponding to the presence of a test impulse.

Figures 1, 2:
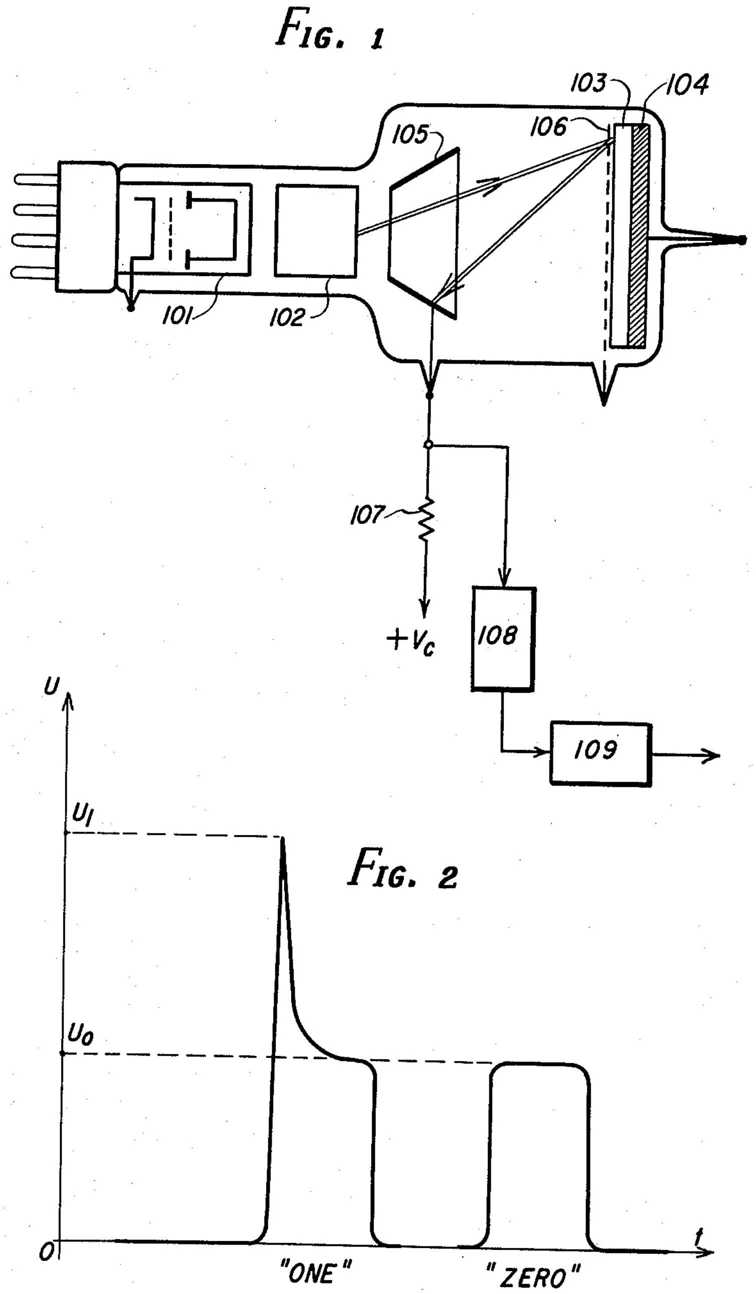
Figure 3:
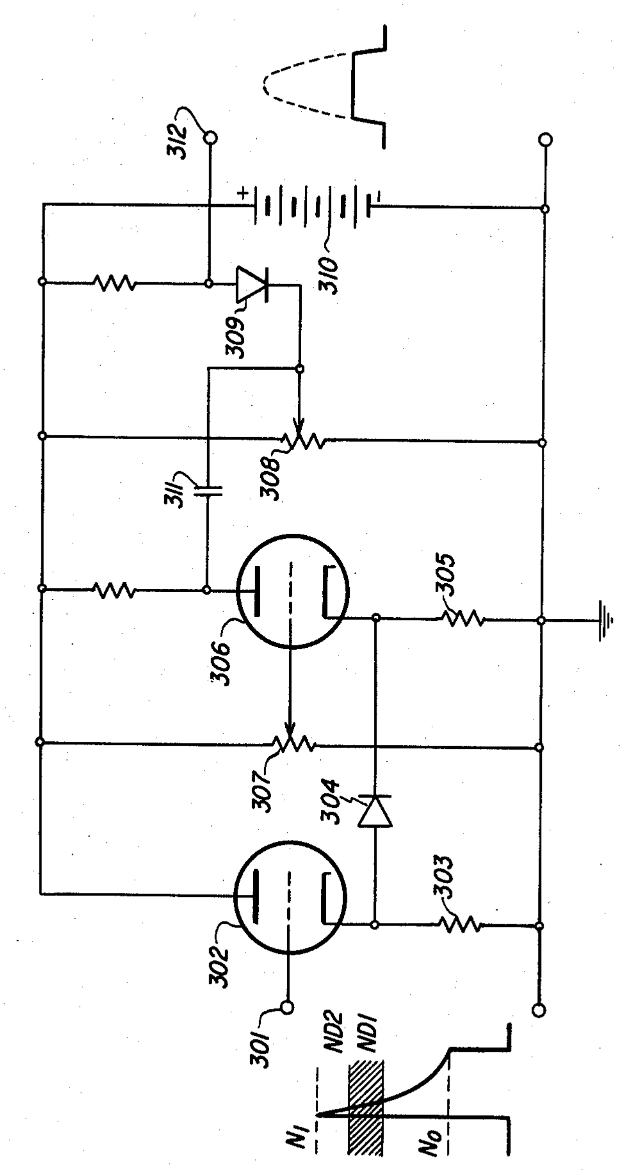
Figure 4:
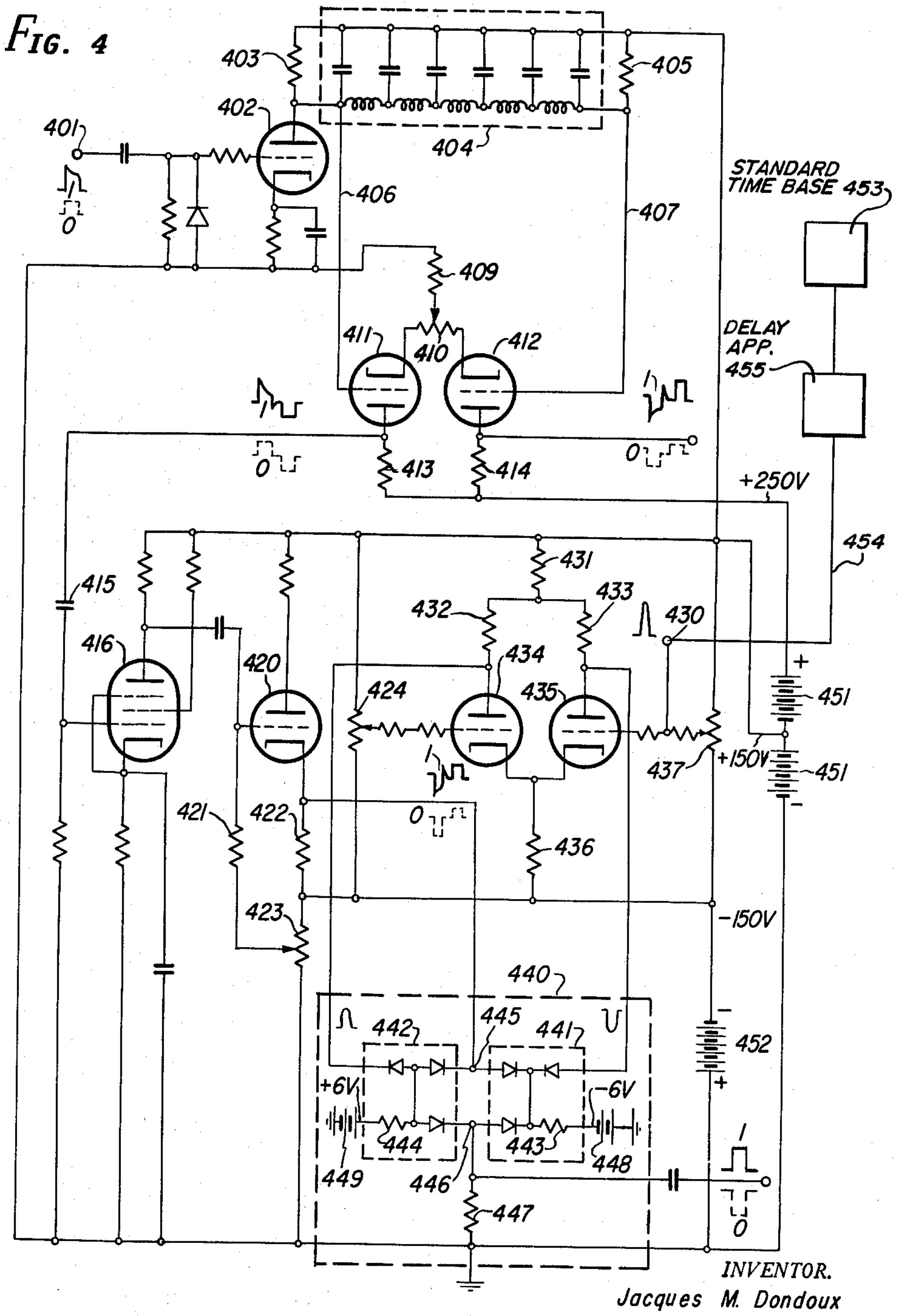

The invention will be better understood upon the reading of the detailed description to follow and the examination of the appended drawings in which:

The FIGURE 1, in one part, shows the construction of a barrier grid electrostatic memory tube and, in the other part, shows the connection of the said tube to the discriminating amplifier of the invention;

The FIGURE 2 gives the aspects of the signals "one" and "zero" which appear at the electrodes of a memory tube;

The FIGURE 3 represents the wiring diagram of a discriminating amplifier of the prior art;

The FIGURE 4 represents the wiring diagram of the discriminating amplifier which is the subject of the invention;

The FIGURES 5, 6, 7, 8, 9 give the aspects of the signals obtained at different points of the discriminating amplifier of the invention.

It is known that in automatic numerical computers, as well as in switchboards for electric automatic telephony, it is necessary not only to assure the registration of the numerical data, but also to conserve the result of the intermediate calculations. A computer or an electronic automatic switchboard contains therefore a temporary memory, that is to say a memory whose content is modifiable upon order from the machine, and as often as the operations effected require it. Among the very numerous types of temporary memory, it is appropriate to cite the barrier grid electrostatic memory tube, particularly interesting by virtue of its high speed of access of the order of one microsecond, and its appreciable information capacity, in the neighborhood of 20,000 binary bits for a single tube.

The bits of information registered one by one in an electrostatic memory tube by the unblocking of the electron beam in particular sweep positions, can be extracted only in the same manner, one after the other. We say that this memory has a "series" character, as opposed to the "parallel" character of certain memories giving several bits of information simultaneously.

To facilitate the description to follow, the construction and operation of a barrier grid electrostatic memory tube wil be reviewed briefly.

FIGURE 1 gives the simplified layout of a barrier grid electrostatic memory tube. This tube is composed of an electron gun 101, a system of deflection plates 102 permitting the deflection, along two axes of rectangular coordinates, of the electron beam emitted by the gun 101, an electrostatic storage surface or "target" 103 of a dielectric substance such as mica, supported by a rigid metallic plate 104.

When the primary electrons of the beam emitted by the gun 101 arrive on the target 103, there is an emission of secondary electrons which are in part collected by an electrode 105 called a "collector," which is strongly positive with respect to the electrode 104. The emission of secondary electrons depends on the nature of the dielectric of the target, on the angle of incidence of the beam of primary electrons, and on the speed of impact of these same primary electrons.

Experience shows that when the target 103 is subjected to the sweep of the beam of primary electrons, its bombarded face acquires a voltage of equilibrium independent of the original state of the target, and which depends primarily on the voltage of acceleration and on the voltage of the collecting anode 105. Each point of the target 103, when it is reached by the electron beam, assumed to be punctual, accordingly accumulates a charge which depends on the potential of the conducting electrode 104, and in particular on the difference of potential between the latter and the collector 105. This charge may be increased or diminished by varying the potential of the electrode 104.

A portion of the secondary electrons produced by the impact of the incident primary electrons fall back on the target 103, thus modifying the contrast of the charges in the neighborhood of the point bombarded. This defect is partially eliminated by a conductive barrier grid 106 made of very fine wires, the meshes of which have a surface of the order of one fifth of the impact area of the electron beam or "spot."

The grid 106, maintained at the reference potential of the electrode 104, that is to say, at its potential for registering a "zero," or for reading, as will be seen later, and located a few hundredths of a millimeter from the dielectric target 103 or even against it, prevents the emitter secondary electrons from leaving under an angle of incidence in the neighborhood of 90 degrees, that is to say, they fall back in the immediate vicinity of the spot. A portion of the secondary electrons is therefore collected by the grid 106 which contributes, like the collector 105, to the fixation of the potential of equilibrium on the dielectric target 103.

In a numerical and binary operation of the barrier grid electrostatic memory tube, the beam of primary electrons is blocked, except in the case where there is a writing or a reading.

In this case, the beam of primary electrons, oriented so as to make the spot coincide with the section of the surface of the target 103 where a binary bit of information is to be written or read, is unblocked while the electrode 104 is carried to a suitable potential.

For the writing of a "zero," the electrode 104 is carried to a potential $V_0$ which may be for example, ground potential.

For the writing of a "one," a voltage $V_1$ of suitable polarity is applied to the electrode 104.

Two different states of equilibrium are thus created on the target. They correspond respectively to two charges of different values, by virtue of the difference $V_1-V_0$ of the voltages established between the substantially equipotential surface of the target 103 and the electrode 104, according to whether it is desired to write a "one" or a "zero."

For reading, the electrode 104 is carried to the potential $V_0$ and we observe the secondary emission of the target 103, either in reading from the target by measuring the target current on the electrode 104 which is equal to the primary current reduced by the secondary current and the barrier grid current, or by reading from the collector by measuring the apparent secondary current on the collector 105.

If, at the time of writing, the potential of the electrode 104 was $V_0$ corresponding to the bit "zero," we observe upon reading, a current of a particular value which is the secondary current of equilibrium.

If, at the time of writing, the potential of the plate 104 was equal to $V_1$ corresponding to the bit "one," we observe upon reading, that a transitory secondary current corresponding to the discharge of the capacitive element delimited by the area of the spot on the target, and therefore to the reestabishment of the equilibrium, is superimposed on the secondary current of equilibrium.

For reading for the collector 105, this electrode is connected, by the intermediary of a resistance 107, to a source of positive voltage $+V_c$. The voltages due to the readings of the data collected at the terminals of the resistance 107 are applied to the input of a preamplifier 108, whose role consists simply in augmenting the amplitude of the signals "zero" and "one" before their discrimination by the shaping device 109, subject of the invention.

Of course, the differential discriminator 109 of the invention is equally suitable for reading from the target, already partially differential by its very principle.

In the explanation to follow, it will be assumed that the voltages $V_0$ and $V_1$ satisfy the relation:

$$V_1-V_0>0$$

Otherwise stated, the reading of a "one" corresponds to a secondary current momentarily increased.

The signals "one" and "zero" collected at the terminals of the resistance 107 present therefore the aspects given in the FIGURE 2.

To fix the scales of values, it may be stated that at the input of the amplifier 108 (FIG. 1), that is to say at the terminals of a resistance 107 of 1,000 ohms, the voltage level is of the order of a millivolt. At the output of the amplifier 108, that is, at the input of the discriminating amplifier 109 of the invention, the voltage level is approximately 0.25 volt.

The passing band for the amplifier 108 is reduced to the strict minimum, particularly on the side of the low frequencies, in order to reduce the noise.

The discriminating amplifier 109 should evidently give a full or a null response according as the output signal exceeds a certain level or is below another nearby level. The window of discrimination generally admitted is 5% of the spread between the average value of the "zeros" and the average maximum value of the "ones."

The FIGURE 3 shows the wiring diagram of a discriminating amplifier of the prior art, which comprises essentially an input tube connected in a cathode follower arrangement and controlling, by means of a diode, a second amplifying tube with the grid connected to ground, like that of the FIGURE 16 of the article by T. S. Greenwood and R. E. Staehler entitled "A High-Speed Barrier Grid Store," which appeared in the American publication "The Bell System Technical Journal," No. 5, September 1958, volume 37, pages 1195 to 1220.

The reading signal, which has a maximum level $N_1$ in the case of a "one," and $N_0$ in the case of a "zero," is applied to the grid 301 of the first amplifying tube 302. This impulse, amplified in strength, is transmitted to the cathode of the tube 306 by way of the diode 304. The tube 306 is responsive to this amplified impulse only if the input signal exceeds a certain level of discrimination ND1, whose value may be regulated with the aid of the potentiometer 307 fed from the plate voltage source 310. Under these conditions, the tube 306 amplifies only that part of the input signal included between the levels ND1 and N1.

Thanks to the potentiometer 308 fed by the plate voltage source 310 through the diode 309 and connected to the plate circuit of the tube 306 by the coupling condenser 311, the quasirectangular signal which appears at the output 312 of the amplifier is that fraction of the input signal included between the voltage levels ND1 and ND2.

As we see, the output signal exists only in the case of the signal "one."

In the particular case of a barrier grid electrostatic memory tube operated in a non-rhythmic manner, it is established that the amplitude of the reading signals is variable, for reasons due to the memory tube itself, or to its control circuit. Only the relationship between the maximum amplitude of the signal "one" and the amplitude of the signal "zero" maintains, in the course of time, an approximately constant value.

For the discriminating amplifier of the prior art described above, the window of discrimination is fixed, without variation. If the amplitude of the input signals increases, a signal "zero" may be taken for a signal "one." If the amplitude of the input signals decreases, all of the impulses may be taken for "zero" signals.

The discriminating amplifier of the invention, shown in FIGURE 4, is not subject to such errors, its operation being based on the comparison between the initial amplitude of the signal "one" and its residual amplitude after a certain delay, when it is practically equal to the amplitude of the signal "zero."

The reading signal "zero" or "one," shown in FIGURE 5*a*, preamplified linearly, is applied to the input 401 of the discriminating amplifier which is connected to the grid of a linear amplifying tube 402.

Let us first consider the case where the reading signal is the signal "one." In the plate circuit of the tube 402 there is connected a delay line 404, whose input and output impedances are suitably fixed by the resistances 403 and 405, and whose delay time $\theta$ is slightly less than the time taken by the signal "one" to reach an amplitude very close to that of the signal "zero."

The voltage peak of the signal "one" appearing at the output 407 of the delay line at the time $t+\theta$, as shown in FIG. 5b, is applied to the grid of a tube 412 of a differential stage amplifier. At the same instant $t+\theta$, the voltage existing at the input 406 of the delay line is that which the signal "one" takes $\theta$ seconds after the initial period $t$ where the signal had its maximum value, as shown in FIG. 5a. The voltage existing at the input 406 is applied to the grid of the second tube 411 of the differential stage amplifier already mentioned.

The output voltage of this differential amplifier may be collected at the terminals of the resistance 414, and then has the form indicated by the FIGURE 5c.

The FIGURE 5c shows the time interval $t_1 \ldots t_2$ in which will be made the analysis of the resulting signal, equal to the difference of the amplitudes of the signals "one" of the FIGURES 5a and 5b. In accordance with the foregoing considerations, it will be easily understood that if the signal "zero" is applied to the input of the discriminating amplifier, there is collected at the terminals of the resistances 413 and 414, during this time interval $t_1 \ldots t_2$, a signal of no amplitude, at least theoretically.

Figure 5:
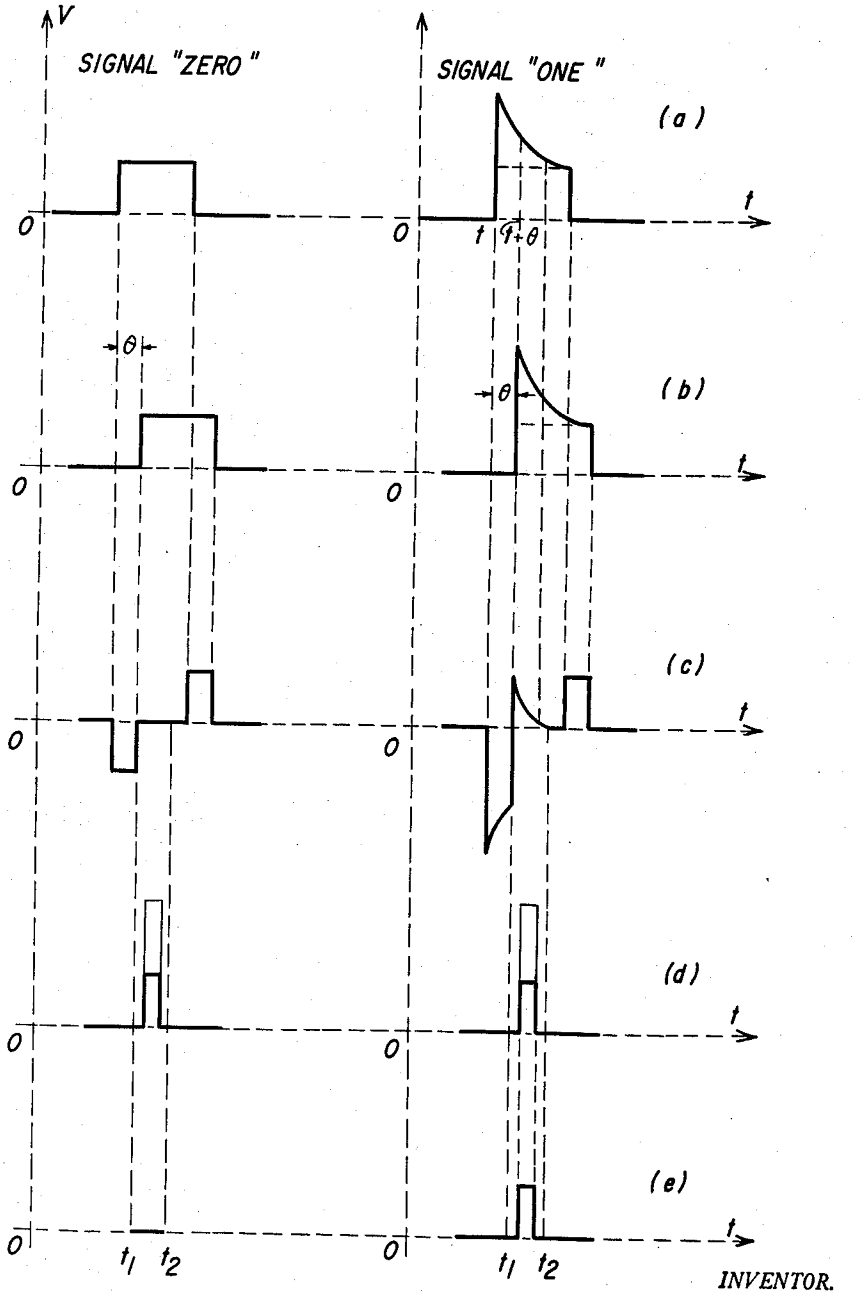
Figure 6:
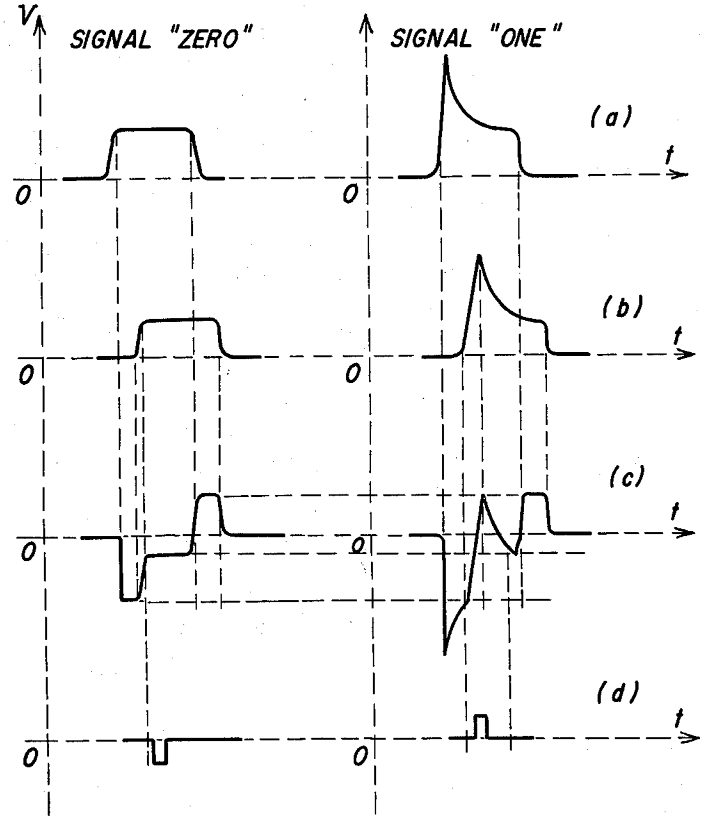

The signals shown in the FIGURE 5 are the signals which we should obtain if the delay line 404 were ideal. Practically, the delay line 404 introduces a slight attenuation of the delayed signal appearing at the output 407. There exists therefore at the terminals of the resistance 414 of the differential stage amplifier a non-null signal for the signal "zero," as is shown in the FIGURE 6, where the theoretical signals of the FIGURE 5 are shown as they effectively appear. The potentiometer 410 inserted in the cathode circuits of the tubes 411 and 412 of the differential amplifier stage permits compensating almost entirely for the attenuation of the delay line 404.

It should be noted that tube 402, whose plate voltage is +150 volts, on the one hand, and the tubes 411 and 412, whose plate voltage is +250 volts, on the other hand, are coupled in a direct manner, that is to say that the conductors 406 and 407 connect the grids of the tubes 411 and 412 to the plate circuit of the tube 402 without the interposition of any condenser. In this manner, we obtain at the output of the differential amplifier stage, signals which are independent of the recurrence of the signals applied to the input 401 of the device. After the differential amplifier stage, the use of condensers in the couplings between tubes is no longer troublesome, since the signal has then a null average value.

The output signal of the differential amplifier, taken for example at the terminals of the resistance 413, is amplified by a pentode amplifier stage 416 of standard type, whose input is connected to the resistance 413 by the condensed 415. At the output of the pentode stage, the signal is again amplified by a triode 420, connected as a cathode follower amplifying tube. The load resistance of this amplifier stage, placed in the cathode circuit, is constituted by the resistance 422 connected to a source of direct current 452 of −150 volts, and to the potentiometer 423, which permits the regulation of the direct current polarization of the grid of the tube 420, connected to the slider of the potentiometer 423 by way of the resistance 421. The role of the potentiometer 423, which permits essentially the modification of the direct current voltage at the input of the six-diode gate 440, will be examined in a detailed manner hereinafter.

The signal coming from the cathode follower stage passes through this gate 440 only if the latter receives a test impulse. This test impulse issues from a standard time base 453 by way of connection 454, which controls the unblocking of the cathode beam of the electrostatic memory tube. It is subjected, with respect to the unblocking impulse of the memory tube, to a delay $\theta$ by delay apparatus 455 equal to that which is applied to the input signal by the delay line 404. Applied to the terminal 430, it is amplified by the action of the triodes 434 and 435, whose commoned cathode circuit is constituted by the polarizing resistance 436 connected to the direct current source 452 furnishing a potential of −150 volts. The plate circuits of these tubes 434 and 435 are respectively constituted by the resistances 432 and 433, the common side of which is placed at a potential of +150 volts provided from the direct current source 451, through the resistance 431. The grids of the tubes 434 and 435 are respectively polarized by means of two potentiometers 424 and 437, both connected in parallel between the points at −150 volts and +150 volts of the sources 452 and 451 in series.

The test impulse is applied to the grid of the tube 435. The plate voltage of the tube 435 is applied to a first group 441 of three diodes of the gate 440. These three diodes have a common connecting point, to which are directed their passing senses. The amplified voltage of the tube 434 is applied to the second group 442 of three diodes of the gate 440. These also have a common connecting point, away from which their passing senses are directed. The common connecting points of the two groups of diodes 441 and 442 are connected respectively, through resistances 443 and 444, to two sources of direct current polarizing voltage 448 of −6 volts and 449 of +6 volts. The input for the gate 440 is constituted by one of the connection points 445 between two diodes of the two groups 441 and 442. The output for the same gate 440 is constituted by the other connection point 446 between two other diodes of the two groups 441 and 442. The signal coming from the gate 440 is collected at the terminals of the resistance 447.

The arrangement which has just been described is called a "six-diode gate," the operation of which is well known.

It is apparent, that when the discriminating amplifier of the invention is adjusted as indicated above, and the average direct current voltage between the gate input and ground is null, during the time of the test impulse included between the instants $t_1$ and $t_2$ of FIGURE 5d, only the signal "one" may appear, as shown in FIGURE 5c, at the terminals of the output resistance 447 of the gate 440.

In passing through the gate 440, the signal "one" may evidently suffer an attenuation. The voltages collected at the output of the gate 440, at the point 446, are necessarily included between:

$$a=-\frac{V}{1+R_2/R_3}\text{ volts} \tag{1}$$

and $$b=+\frac{V}{1+R_1/R_3}\text{ volts} \tag{2}$$

in which:

+V is the voltage at the point of connection of the source 449 and the resistance 444;
−V is the voltage of the point of connection of the source 448 and the resistance 443;
$R_1$ is the value of the resistance 444;
$R_2$ is the value of the resistance 443;
$R_3$ is the value of the resistance 447.

The interval $a \ldots b$ determines the width of the window of discrimination, inside of which there is a linear and continuous transmission of the signal between the input 445 and the output 446 of the gate 440.

Figure 7:
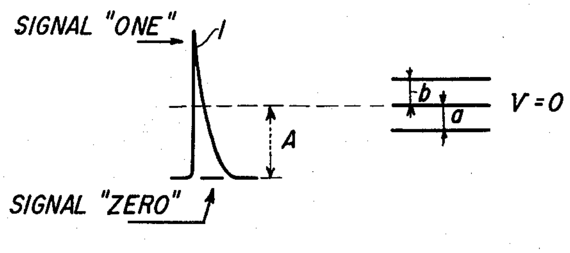

At the input 445 of the gate 440, during the time interval $t_1 \ldots t_2$, the signal "one" has the aspect of the diagram 1 of the FIGURE 7. When the test impulse is not present, the voltage at the output of the gate 440 is nil. When the test impulse is present, several cases may be distinguished:

(a) When the signal at the input of the gate 440 has a potential between the levels $a$ and $b$ (Diagram 2 of FIGURE 7), the output signal has the same potential;

(b) When the signal at the input of the gate 440 has an amplitude superior to $b$, we collect at the output of the gate 440 only the amplitude $b$;

($c$) When the signal at the input of the gate 440 has an amplitude inferior to $a$, we collect at the output only the amplitude $a$.

It will be readily understood that it is possible by manipulating the potentiometer 423, to regulate the reference amplitude A (FIG. 7), with respect to which the presence or absence of a signal at the input of the gate 440 is to be distinguished.

Several solutions are then possible. By way of example, two opposite cases will be cited:

($a$) If it is desired to obtain an output pulse signal of amplitude $b$ (Formula 2) for a signal "one," and a negative signal of amplitude $a=-b$ (Formula 1) in the case of a signal "zero," it will be necessary to choose: $R_1=R_2$.

Figure 8:
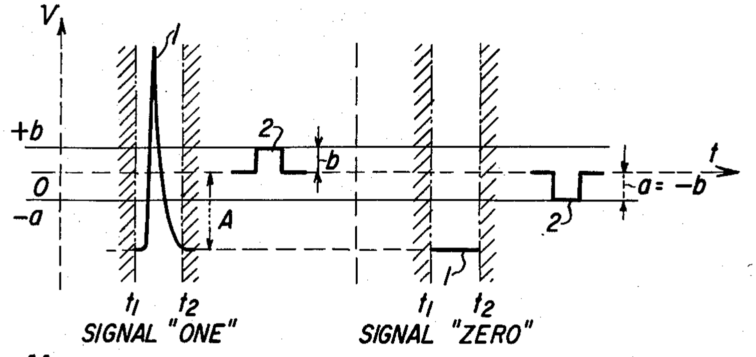

The FIGURE 8 represents the signals "one" and "zero" obtained. The references 1 indicate the aspects of the signals at the input 445 of the gate 440; the references 2 indicate the aspects of the signals at the output 446 of the gate 440.

Every signal of an absolute amplitude greater than $a+b$ present at the input of the gate 440 at the moment of test, will be taken to be a signal "one," and will be translated by a positive signal of amplitude $+b$ at the output of the gate 440.

Every signal of an absolute amplitude less than $A-b$ present at the input of the gate 440 at the moment of test, will be taken to be a signal "zero," and will be translated by a signal of negative amplitude $-a$ at the output of the gate 440. It should be recalled that the value of A is adjustable by means of the potentiometer 423.

($b$) If it is desired to obtain a pulse signal of amplitude $+b$ in the case of a signal "one," and a null signal in the case of a signal "zero," it will be necessary to choose $R_1$, $R_2$, $R_3$ so that:

$$b=+\frac{V}{1+R_1/R_3}$$

$$a=-\frac{V}{1+R_2/R_3}\cong 0$$

that is to say that $R_2$ should be very great before $R_3$.

Figure 9:
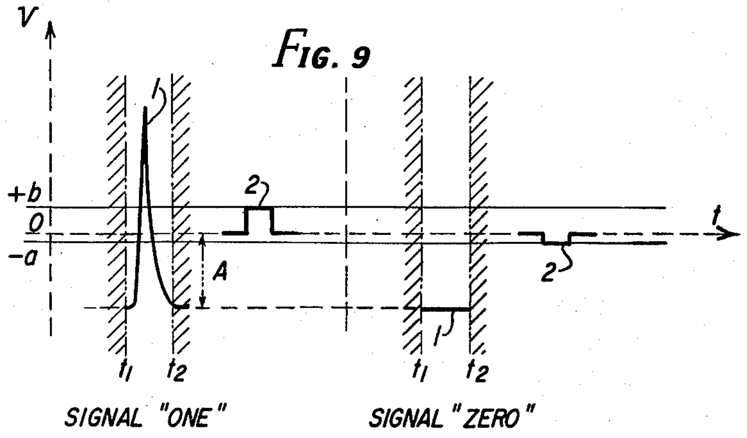

The FIGURE 9 represents the signals "one" and "zero" obtained.

In this latter case, there is an advantage in making the window of discrimination $a+b$ as small as possible. We are limited in this direction by the capacities which exist between the electrodes of the diodes of the gate 440, and by the voltage drop between the electrodes of these diodes when they are unblocked. We may however, obtain a supplemental reduction in the window of discrimination by adding a linear amplifier to the output of the gate 440.

What is claimed is:

1. An arrangement for discriminating between signals appearing at a terminal and representing a first and a second condition, respectively, the signal representing said first condition having a high transitory amplitude near the beginning of the signal and the signal representing said second condition having a lower amplitude than the signal representing said first condition, both of the signals being subject to variations in maximum amplitudes said discriminating arrangement comprising: signal delay means; signal comparing means having a first and a second input point and an output point, said first input point being connected to said terminal directly and said second input point being connected to said terminal through the medium of said delay means; and sampling means connected to said output point, said sampling means including gating means having an input connection, an output connection and a control point, and signal control means including circuit connections to said control point of said gating means, said gating means operated in response to the coincidence of a signal from said signal comparing means and a signal, delayed in time with respect to said signals representing said first and second conditions, by an interval corresponding to the delay introduced by said delay means, from said signal control means to produce at the output connection of said gating means an output signal representing the signal appearing at said terminal.

2. The combination as claimed in claim 1 wherein said signal delay means comprises an input terminal, an output terminal and a lattice network of impedance elements connected between said input and said output terminals, the connection and magnitude of said impedance elements being such that the delay time of a signal traversing said signal delay means is slightly less than the time taken for the amplitude of a signal representing said first condition to decay to an amplitude close to that of a signal representing said second condition.

3. An arrangement for discriminating between signals appearing at a terminal and representing a first and a second condition, respectively, the signal representing said first condition having a high transitory amplitude near the beginning of the signal and the signal representing said second condition having a lower amplitude than the signal representing said first condition, both of said signals being subject to variation in maximum amplitudes, said discriminating arrangement comprising: linear amplifier means having an input terminal and an output terminal; signal comparing means having a first and a second input point and an output point, circuit connections extending between said output terminal of said linear amplifier means and said first input point of said signal comparing means; signal delay means having an input terminal and an output terminal connected between said output terminal of said linear amplifier means and said second input of said signal comparing means, said signal comparing means generating at said output point a signal based on the comparison between the initial amplitude of a signal, applied at said second input point, and its residual amplitude after a time delay corresponding to the delay introduced by said delay means, applied at said first input terminal; a connection for applying said signals representing said first and said second conditions to said input terminal of said linear amplifier means; gating means having an input connection, an output connection and a plurality of control points; amplifier means connecting the output point of said signal comparing means to the input connection of said gating means; and signal control means including circuit connections to each of said plurality of control points of said gating means, said gating means operated in response to the coincidence of a signal from said signal comparing means and a signal, delayed in time with respect to the beginning of said signals representing said first and second conditions by an interval corresponding subtantially to the delay introduced by said delay means, from said signal control means to produce at the output connection of said gating means a signal representing said first condition.

4. The combination as claimed in claim 3 wherein said gating means includes impedance means for varying the output of said gating means whereby the output signals which are to indicate the presence of a signal representing said first and said second conditions may be varied.

5. The combination as claimed in claim 3 wherein said amplifier means includes regulating means for regulating the reference amplitude of signals impressed on said gating means whereby the maximum amplitude of signals to be recognized by said gating means as a signal representing said first condition may be varied.

6. The combination as claimed in claim 3 wherein said signal comparing means is a differential amplifier.

7. The combination as claimed in claim 6 wherein said differential amplifier comprises a pair of electron discharge devices each having an anode, a cathode and a control electrode; and attenuation compensating means connecting both said cathodes of said electron discharge devices whereby the attenuation of said signals traversing said signal delay means is substantially eliminated.

8. The combination as claimed in claim 7 wherein said signal delay means comprises an input terminal, an output terminal and a lattice network of impedance elements connected between said input and said output terminals, the connection and magnitude of said impedance elements being such that the delay time of a signal traversing said signal delay means is slightly less than the time taken for the amplitude of a signal representing said first condition to decay to an amplitude close to that of a signal representing said second condition.

9. The combination as claimed in claim 8 wherein said impedance elements are capacitors and inductors connected in a lattice network to form a delay line.

10. The combination as claimed in claim 9 wherein said gating means comprises a plurality of diodes connected in two groups of diodes, a control point individual to each of said groups, and an input connection and an output connection common to both of said groups.

11. The combination as claimed in claim 10 wherein said signal control means comprises a plurality of electron discharge devices connected in an amplifier arrangement, said signal control means having an output connection extending from each of said devices to one of said control points of said gating means and operated in response to a signal, delayed in time with respect to the beginning of said signals representing said first and second conditions by an interval corresponding to the delay introduced by said signal delay means, applied to one of said devices to produce on each of said outputs a control signal.

References Cited in the file of this patent

UNITED STATES PATENTS

| | | |
|---|---|---|
| 2,434,921 | Grieg | Jan. 27, 1948 |
| 2,806,651 | Fernsler | Sept. 17, 1957 |
| 2,885,551 | Greanias | May 5, 1959 |
| 2,934,708 | Stuntz | Apr. 26, 1960 |